B. B. BRIGGS.
Mole-Plow.
No. 284. A. I. Patented June 26, 1860.
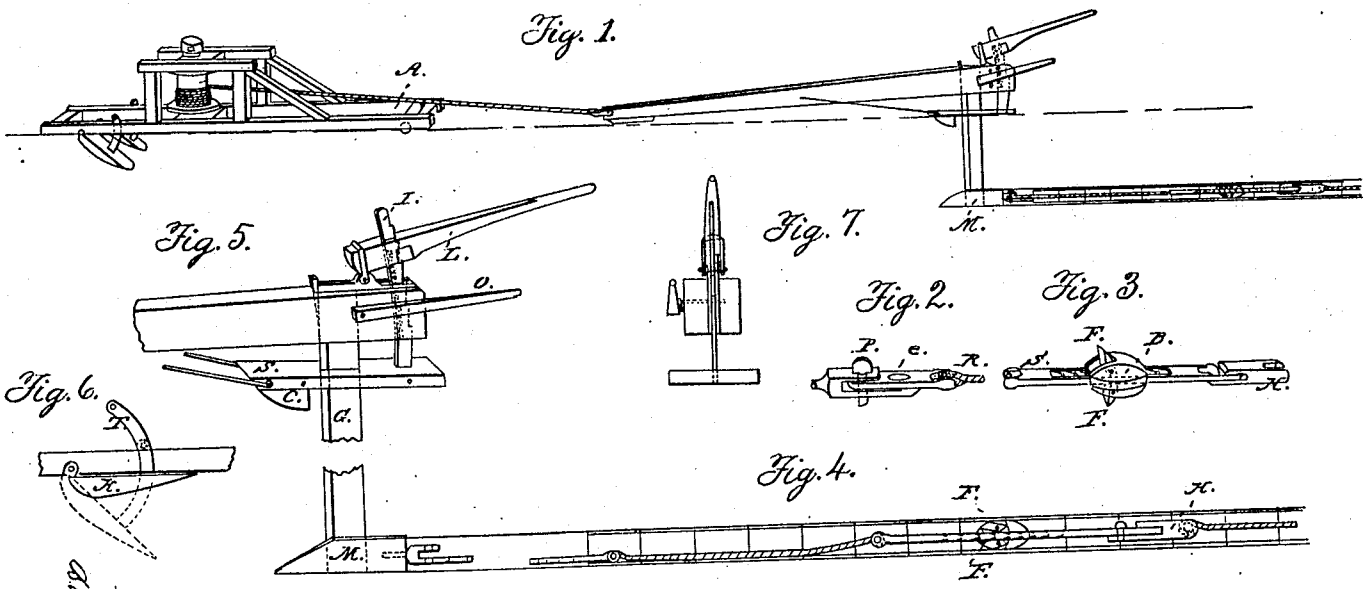
Witnesses:
Inventor:
B. B. Briggs.
N. PETERS, PHOTO-LITHOGRAPHER, WASHINGTON, D. C.

UNITED STATES PATENT OFFICE.

B. B. BRIGGS, OF SHARON, OHIO.

IMPROVEMENT IN APPARATUS FOR LAYING DRAIN-TILE.

Specification forming part of Letters Patent No. 25,624, dated October 4, 1859; Additional Improvement No. 284, dated June 26, 1860.

*To all whom it may concern:*

Be it known that I, B. B. BRIGGS, of Sharon, in the county of Medina, in the State of Ohio, have invented a new and useful Improvement on the Machine for Laying Drain-Tile, called "Apparatus for Laying Drain-Tile;" and I do hereby declare that the following is a full, clear, and exact description of the construction and operation of the same, reference being had to the annexed drawings, making a part of this specification, in which—

Figure 1 is a view of the apparatus for laying the tile. Fig. 2 is a perspective view of the mole attachments. Fig. 3 is a perspective view of the clutch and its attachments. Fig. 4 is a perspective view of the clutch and its attachments as connected with the eye of the mole attachment in the attitude of being withdrawn from the tile. Fig. 5 is a perspective view of the back end of the beam with the grading apparatus; Fig. 6, a view of the folding prog for holding the capstan-frame to the ground. Fig. 7 is a transverse section of the back end of the beam and grading apparatus. These figures will be referred to and explained hereinafter.

Like letters refer to like parts.

M, Fig. 1, is the mole, made of cast-iron, corresponding in shape with the tile used, but somewhat larger in diameter, Fig. 2 representing the staple and its attachment, which are both provided with an oblong eye, E, and so made that the one in the staple is a little forward of the other. When I wish to detach, a small iron-pointed lever is put into these eyes, and by prying forward the pin P will be liberated, and can be withdrawn. Into the back end of said attachment is spliced one end of the rope or chain R, which can be from fifteen to fifty feet in length, (depending upon the quality of tile used,) the succeeding sections to be of the same length as the first; and upon the back end of each section of rope is spliced the slide *g*, as shown in Fig. 3. Said slide is provided with notches about three-eighths of an inch apart upon both sides of it for a distance of about one foot, into which the double-acting finger or clutch F F catches when in a position at right angles to the slide *g*, thus keeping the ball B from sliding back while in that position, and by means of which each section of tile is made to fit closely to the preceding one.

In Fig. 4 the clutch is represented in a folded position, as when being withdrawn after the tile have been carried to their destined point, in which position the clutch block or ball can be removed from the slide after detaching the hook of the succeeding section, H. This lock-hook H is made with an oval point corresponding to the eye in the back end of the slide, and can be inserted or withdrawn from the slide in no other position than at right angles to said slide, but after being inserted it can be turned parallel to the slide, as the pivot-neck of the hook is reduced to a round form, and the body of the hook is provided with an opening to receive the end of the slide, thereby rendering the attachment firm and perfectly secure. The clutch block or ball is to be made of metal or some other substantial material, as are all of the attachments.

The ball B is so constructed that the finger or clutch bears upon a shoulder near the outer edge of the ball while in the attitude of taking in tile, being left open in front of the finger, and also back of its pivot upon the inner side of the ball, that the clutch or finger can turn easily upon its pivot, and differing from my previous invention in having a double-acting clutch, sustaining itself upon the slide instead of resting against the hook of the succeeding section, and in having a longer slide, enabling me to set the sections of tile more closely together, also the lock-hook, leaving no possible chance for it to become detached or catch in the tile while being withdrawn, also the mole attachments, rendering it more easily detached from the mole; also the grading apparatus to the beam of the mole-plow, the folding prog to the capstan-frame differing from others used with the ordinary mole-plow, as hereinafter described. In Fig. 5 the slide *s* is attached to the beam by an iron rod upon each side, hinged at or near the middle of the beam, and to the slide *c* is a thin sloping colter made fast in the bottom of the slide forward of the main colter G.

I is an upright curved, shaft perforated near the middle and notched upon its back edge, as seen in the engraving. The lever L is hinged to the beam near the front edge of the shaft, and so made as to catch in the notches in the back edge of said shaft as it is borne down. The lower end of the shaft is pivoted to the slide while forcing down upon the lever L, the shaft and slide serving as a fulcrum. The beam and mole are elevated as may be desired, and secured at such point by means of the pivoted pin in the small lever O. When a greater depth is required to make the grade uniform, remove the pin from the shaft and the downward draft of the mole will carry it to the desired point.

The folding prog, as shown in Fig. 6, is hinged near the front end of each sill to the capstan-frame, and provided with a pivoted colter-brace, T, which slides through the sill, and while holding the frame bears upon a pin resting on top of the sill, and as the capstan-frame is being moved forward the prog folds under the sill, serving as a slide to the sill. Near the back end of the frame is attached a roller, A, in Fig. 1, upon which rests a part of the frame, rendering it more easily moved from place to place.

In the use of this apparatus the mole is placed in the earth at a suitable depth, sloping the excavation gently back. The power-rope is attached to the end of the beam and to the capstan. The capstan-frame is then moved forward in the direction the tile are to be laid about one hundred feet, the length of the power-rope. The front end of the frame is then elevated so that the points of the progs will enter the earth, and as the team moves around, the frame coiling the rope upon the capstan, the progs will sink into the earth, holding the frame firmly. The first section of tile-rope being attached to the heel of the mole, it is strung with tile to within about three feet of the mole, which space is required at the next excavation; then slip on a set of clutches, which prevent their sliding back. The work of laying is then ready, and as they are being carried forward the succeeding section is strung and attached, thus continuing to attach section after section until so much is taken in as the strength of the the tile-rope will admit—say two or more hundred feet. Then make an excavation at the heel of the mole, sloping it backward as before, detach the rope from the mole, when the tile-rope can be easily withdrawn from the place of entrance, the clutches folding into the balls as the draft is backward, and as the balls and attachments are smaller than the caliber of the tile no obstruction is presented to their easy removal. The front section is then attached to the mole again, when the work proceeds as before. The small space left at each excavation must be put in by hand and the earth replaced. The capstan is moved forward at each length of power-rope by removing the lever from the spool and hitching the team to the front end of the frame. The rope will uncoil as it moves forward. The grade is kept uniform by having two stakes set near the far end of the proposed ditch, which are to serve as a range. There being a sight-staff set in the back end of the beam, the slide is elevated or depressed, as may be necessary to keep them in range.

What I claim as my improvement, and desire to secure by Letters Patent, is—

The herein-described ball B, the double-acting clutches or fingers F F, with its notched slide *g*, and lock-hook attachment H, the mole attachments, as in Fig. 2, when used in combination with the rope R or its equivalent.

B. B. BRIGGS.

Witnesses:
G. W. TIBBITTS,
E. P. INGERSOLL.